Feb. 20, 1962   F. J. NEWHOUSE ET AL   3,021,659
DRIVE MECHANISM FOR SWATHERS
Filed Feb. 8, 1960   3 Sheets-Sheet 1

INVENTORS.
FRANK J. NEWHOUSE &
BY   EUGENE METH

ATTORNEYS.

INVENTORS.
FRANK J. NEWHOUSE &
EUGENE METH

ATTORNEYS.

3,021,659
DRIVE MECHANISM FOR SWATHERS
Frank J. Newhouse, Toronto, Ontario, and Eugene Meth, Port Credit, Ontario, Canada, assignors to Massey-Ferguson Limited, Toronto, Ontario, Canada, a corporation of Canada
Filed Feb. 8, 1960, Ser. No. 7,453
4 Claims. (Cl. 56—192)

The invention relates to agricultural machines such as swathers or windrowers and more particularly to swathers adapted to be pulled behind a tractor or other vehicle.

One object of the invention is to provide an improved drive mechanism for supplying power to the driven components of the swather from the power take-off shaft of the tractor.

Another object is to provide drive mechanism for machines of the above general character in which the high speed shafts and associated rotating parts are effectively enclosed and guarded for maximum safety.

Still another object is to provide improved mechanism for driving the cutter bar or sickle, the reel and the conveyor or apron of a swather and having means for supporting and driving a hydraulic pump when it is desired to adapt the machine for use with tractors lacking an available source of pressure fluid.

Other objects and advantages of the invention will become apparent from the following detailed description of the preferred embodiment illustrated in the accompanying drawings in which—

Figure 1:
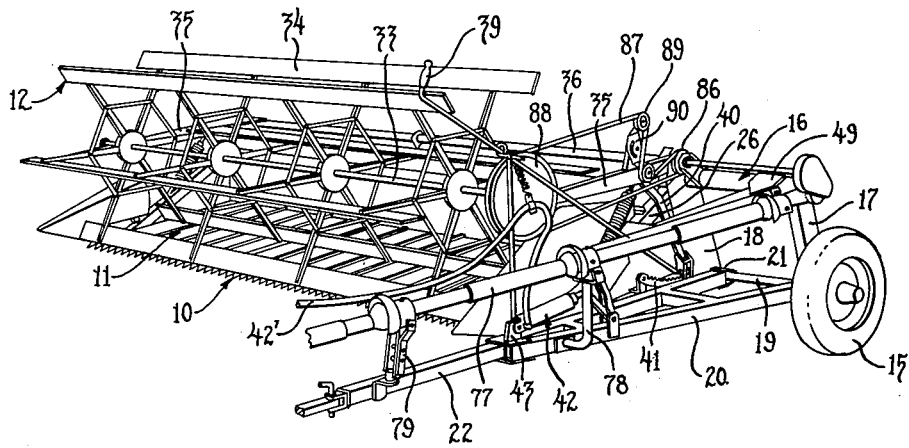
FIGURE 1 is a perspective view of a swather equipped with driving mechanism embodying the features of the invention.

While a preferred form of the invention has been shown and will be described herein, it is not intended to limit the invention to details of the particular embodiment illustrated, the intention being to cover all modifications and adaptations falling within the spirit and scope of the invention as more broadly or generally characterized in the appended claims.

For purposes of illustration, the invention has been shown as incorporated in a swather adapted to be pulled behind a tractor which also supplies power for driving the power operated components of the swather. Such components include a cutter bar or sickle 10 positioned to cut a standing crop of grain or the like across a relatively wide swath disposed at right angles to the direction of travel of the swather. Disposed at the rear of the cutter bar and positioned to receive the cut crop material is a conveyor or apron 11 which carries the cut crop material laterally and bunches or compacts it at one end of the swather platform from which it is discharged to form a windrow as the swather moves forwardly. To facilitate the cutting of the crop material and its deposit on the apron, a paddle carrying reel 12 is supported above the cutter bar for rotation about an axis parallel to the bar.

In the exemplary swather, the power driven components are carried on an elongated main frame supported at opposite ends by ground wheels 15. The main frame may be of generally conventional construction except that in the improved form contemplated by the invention, it is constructed with a large diameter tubular main frame member 16 extending across the back of the swather. Rigid legs 17 depending from opposite ends of the member 16 provide mountings for the ground wheels 15.

Figure 2:
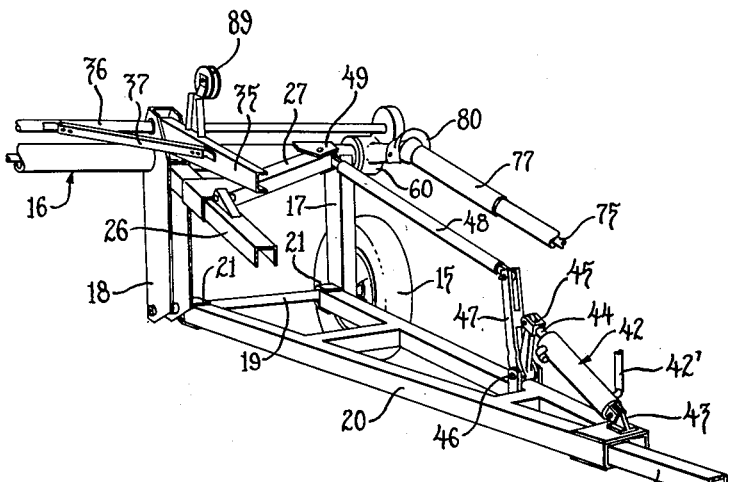
FIG. 2 is a fragmentary perspective view of the swather frame showing a portion of the structure for coupling the same to a tractor.

Adjacent one end of the main frame, the left end, in this instance, the frame member 16 has a third rigid depending leg 18 in the form of a forwardly facing metal channel welded to the member 16 at its upper end. The leg 18 is disposed parallel to and spaced from the adjacent leg 17 and cooperates with it in supporting a cross shaft 19 for attachment of an A-frame constituting a part of the structure for coupling the swather in trailing relation to the tractor. As shown in FIG. 2, the two legs of the A-frame 20 are pivotally secured to the shaft 19 by clamping straps 21. From the apex of the A-frame a tongue 22 extends forwardly for coupling with a drawbar or other attaching device on the tractor.

For supporting the cutter bar 10 and conveyor 11 the main frame includes a platform 25 secured to the main frame member 16 as by radially projecting arms 26. Diagonal brace bars 27 extending between the arms 26 and the main frame member serve to impart rigidity to the structure. The cutter bar 10 which is mounted adjacent the forward edge of the platform includes a knife bar 28 adapted to be reciprocated relative to a stationary knife bar by a sway bar 29 pivoted intermediate its ends as at 30 on the platform 25 or other appropriate part of the frame structure.

As indicated above, the conveyor 11 is disposed immediately to the rear of the cutter bar. As shown, the conveyor comprises an endless belt or apron 31 running over rollers 32 journalled at opposite ends of the platform. One of the rollers is driven as described hereinafter to traverse the apron in a direction to carry the cut crop material toward the right as viewed in FIG. 3. It will be understood that the sway bar 29 is disposed between the two runs of the apron.

The reel 12, which feeds crop material to the cutter, may be of conventional form. Thus, it comprises a shaft 33 fitted with axially spaced spiders supporting a series of longitudinally disposed paddles or bats 34. The shaft 33 is supported at opposite ends in bearings carried by the forwardly projecting arms 35 of a reel frame. As shown in FIG. 2, the arms 34 are rigidly connected by a tubular member 36 which, in this instance, is pivotally supported in the projecting end of the leg 18 and in a similar projection on the leg 17 at the opposite end of the frame. Diagonal brace bars 37 between the arms and the member 36 hold the reel frame rigid. The pivotal mounting of the reel frame permits the reel to be adjusted vertically relative to the cutter bar so that the paddles 34 of the reel are enabled to push the standing crop material into operative relation to the cutter bar and then gently lay the cut material on the conveyor 11. Adjustment of the reel frame may be effected in any convenient manner as by a pull rod 39 and a link 40 cooperating with a cam 41 on the main frame structure.

Adjustment of the platform and cutter bar to determine the cutting height is effected by rocking the main frame relative to the A-frame 20 about the axis of the shaft 19. It will be understood, of course, that in operation the position of the A-frame is fixed by its connection with the tractor. In the exemplary machine, height adjustment is effected by a pressure fluid operated actuator 42 of the cylinder and piston type. The actuator cylinder in this instance is pivotally attached at its closed end to a bracket 43 welded or otherwise fixed to the forward end of the A-frame 20. A piston rod 44 projecting from the open end of the actuator cylinder operatively connects the actuator piston with one arm 45 of a bell crank pivoted at 46 on the A-frame 20. The other arm 47 of the bell crank is connected by a rigid link 48 with the main frame adjacent its upper end, in this instance, through the medium of a bracket 49 welded or otherwise attached to the frame member 16. Accordingly, upon admission of pressure fluid to the actuator cylinder the bell crank is rocked rearwardly and through the link 48 rocks the main frame in a direction to raise the cutter bar from the ground. When the actuator cylinder is opened to exhaust, the actuator piston is faced inwardly by the weight of the frame structure and the components which it supports and the cutter bar is lowered relative to the A-frame.

Figure 3:
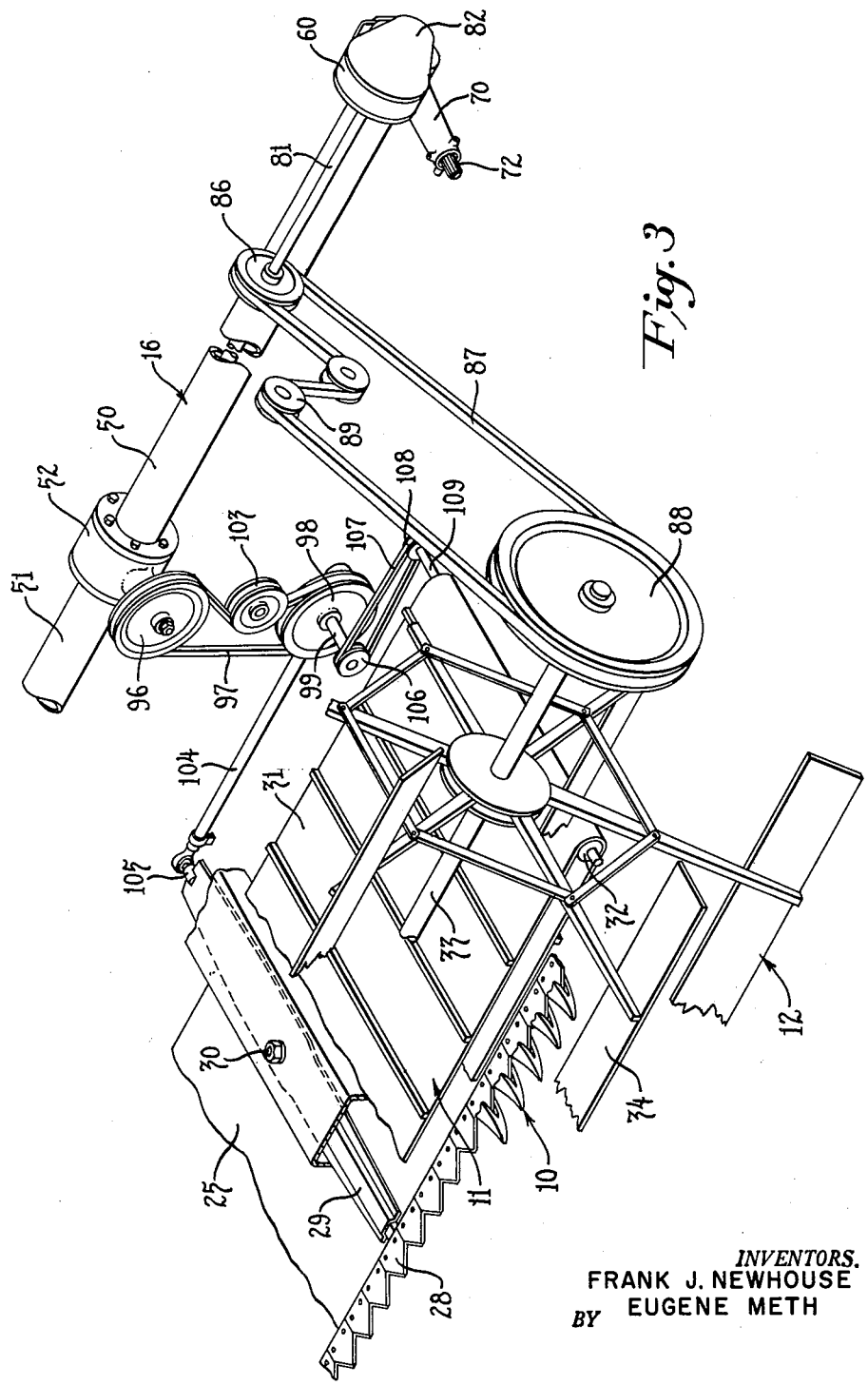
FIG. 3 is an enlarged partly diagrammatic perspective showing details of the mechanism for driving the reel, the cutter bar and the conveyor apron.
Figure 4:
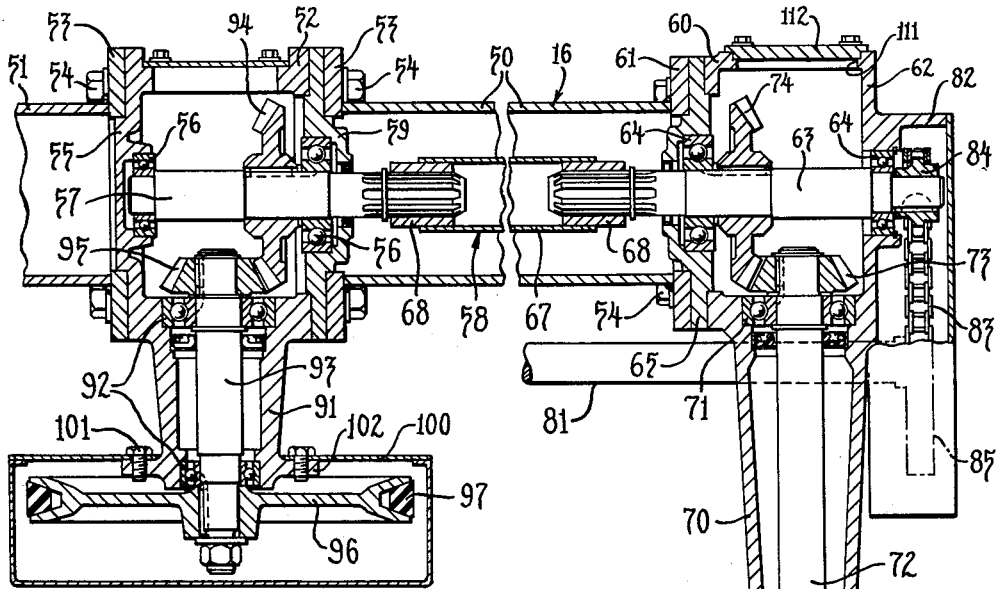
FIG. 4 is an enlarged fragmentary sectional view through the structure supporting and enclosing the drive mechanism.

In accordance with the invention the main frame member 16 is utilized to support and house most of the high speed elements of the mechanism for driving the cutter bar 10, the conveyor 11 and the reel 12. For this purpose, the member 16 is made in two sections 50 and 51 coupled together in axial alinement by a housing 52 as shown in FIGS. 3 and 4. For convenience of assembly, the two sections of the member are terminated in flanges 53 dimensioned to register with the sides of the housing and to be secured thereto as by screws 54.

As shown in FIG. 4, one end of the housing 52 is closed by a transverse wall 55 centrally recessed to provide a seat for an antifriction bearing 56. This bearing journals one end section 57 of a main drive shaft 58 from which the various components of the machine are driven as will appear presently. The shaft section 57 projects through the other end of the housing and into the adjacent end section 50 of the frame member 16. A circular plate 59 clamped between the flange 53 and the adjacent end of the housing provides a seat for a second antifriction bearing 56 for the shaft section 57.

Secured to the other end of the frame member section 50 is a housing 60 having one end open and dimensioned to mate with a flange 61 on the adjacent end of the section 50. Screws 54 secure the head to the frame section. The other end of the housing is closed by a wall 62 apertured to provide a passage for the other end section 63 of the main drive shaft 58 and seating an antifriction bearing 64 journalling the shaft section. A plate 65 clamped between the housing and the flange 61 is centrally apertured to allow the shaft section 63 to extend into the section 50 and to seat a second antifriction bearing 64 for the shaft section.

As shown in FIG. 4, the two shaft sections 57 and 63 are drivingly connected to form the main drive shaft by an elongated coupling member 67. The coupling member as shown is tubular and is fitted at opposite ends with internally splined coupling sleeves 68 adapted to cooperate with the complementarily splined ends of the shaft sections.

Provision is made in the housing 60 for drivingly connecting the main drive shaft 58 with the power take-off shaft of the tractor or other towing vehicle to which the machine is coupled. For this purpose the housing is formed with an elongated neck 70 projecting forwardly from the housing. The neck is open at its outer end and to the interior of the housing and seats spaced antifriction bearings 71 journalling a power input shaft 72. A beveled pinion 73 keyed to the inner end of the shaft 72 within the housing meshes with a beveled gear 74 keyed to the shaft section 63 to transmit driving power to the main shaft.

The forward end of the shaft 72 projects from the neck 70 and is splined for connection with a power take-off coupling shaft 75 (FIG. 2). The coupling shaft is of the conventional sectional type with the sections joined by universal joints 76 such as that shown in FIG. 4. As shown in FIGS. 1 and 2, the coupling shaft is completely enclosed in a shield 77 formed by telescoping tubular members having interengaging bell-shaped portions enclosing the universal joints. Suitable brackets 78 and 79 on the A-frame 20 and tongue 17 support the shield 77. A shield 80 (FIG. 4) mounted on the outer end of the neck 70 extends over the bell-shaped end of the shield 77 to enclose the adjacent universal joint 76 without interfering with the relatively angular movements of the coupling and power input shafts when required.

The structure so far described provides for driving the main shaft 58 directly from the power take-off shaft of the tractor to which the machine is coupled. The rotative speed of the main shaft is determined, of course, by the ratio of the pinions 73 and 74. The various power operated components of the machine are all driven from the main shaft 58 through drive connections affording the proper relative speed ratios.

Referring more particularly to FIGS. 3 and 4 of the drawings, the drive for the reel 12 includes an intermediate shaft 81 supported externally of the frame member 16 in suitable bearings carried on the frame member with its axis parallel to the axis of the main drive shaft. The outer end of the shaft 81 extends into a casing 82 carried on the outer end wall 62 of the housing 60. Within the casing the main drive shaft is connected with the intermediate shaft by a drive chain 83 running over sprocket wheels 84 and 85 keyed respectively to the shaft section 63 and to the shaft 81.

Adjacent its other end the shaft 81 carries a grooved pulley 86 (FIG. 3) connected by a V-belt 87 with a grooved pulley 88 keyed to the reel shaft 33. Suitable means such as a belt tensioning pulley may be provided for starting and stopping the reel when desired. A belt tightening pulley 89 for performing that function is shown in FIG. 1, the pulley being mounted on an adjustable bracket 90 carried on one of the reel supporting arms 34.

Turning now to the drives for the cutter bar 10 and conveyor 11 it will be noted that they have a common drive connection with the main drive shaft 58. As shown in FIG. 4, the housing 52 is formed with a forwardly projecting neck 91 open at its outer end and also open to the interior of the housing. Spaced antifriction bearings 92 seated in the neck journal a shaft 93 drivingly connected with the main shaft 58. The drive connection includes a pair of intermeshing beveled gears 94 and 95 keyed respectively to the shaft section 57 and to the shaft 93.

Keyed to the outer end of the shaft 93 which projects beyond the neck 91 is a grooved pulley 96 connected by a V-belt 97 with a pulley 98 (FIG. 3) fixed to a shaft 99 journalled in suitable bearings which may be carried either by the frame structure or by a housing 100 enclosing the pulleys and driving belt. The housing is rigidly secured as by screws 101 to a flange 102 provided on the outer end of the neck 91 as shown in FIG. 4. In the present instance a belt tension adjusting pulley 103 is also suitably mounted in the housing 100 for cooperation with the belt 97 as shown in FIG. 3.

In the particular swather illustrated, the pulley 98 is fitted with an eccentric crank pin journalling one end of a connecting rod 104. The other end of the connecting rod is journalled on a stud 105 rigid with and projecting from the end of the sway bar 29 remote from the cutter bar knife 28. Accordingly, rotation of the pulley 93 serves to rock the sway bar about its pivot 30 and thus impart reciprocatory movement to the cutter bar knife.

The drive for the conveyor 11 is derived from the shaft 99 through a grooved pulley 106 keyed to the shaft. The pulley is connected by a V-belt 107 with a pulley 108 fixed to a shaft 109 upon which one of the conveyor rollers 32 is nonrotatably mounted.

Figure 5:
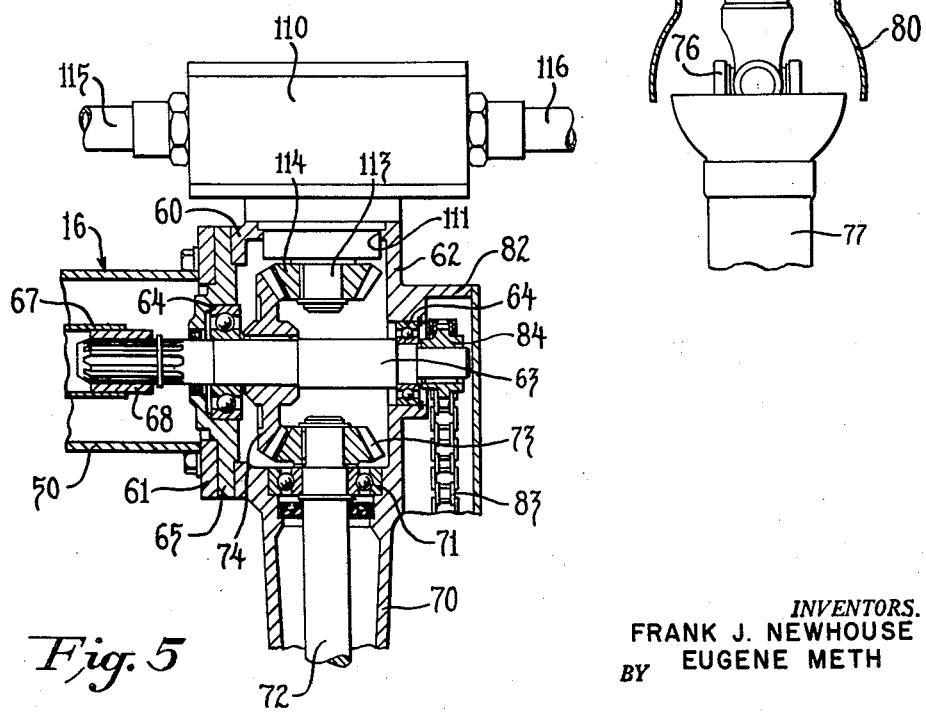
FIG. 5 is an enlarged fragmentary sectional view of the drive mechanism with a hydraulic pump installed.

FIG. 5 shows the manner in which a hydraulic pump 110 may be mounted and driven from the main drive shaft to provide a supply of pressure fluid when none is available from the tractor to which the swather is coupled. When the swather is coupled to a hydraulically equipped tractor, pressure fluid for operating the height adjusting actuator 42 is supplied from the tractor hydraulic system through a conduit 42' and suitable control valving mounted on the tractor. Lacking such a source of pressure fluid, the pump 110 may be mounted on the swather as shown in FIG. 5 and connected with the actuator 42 by suitable conduits and control valving.

To accommodate the mounting of the pump 110 the housing 60 is formed with an opening 111 in one side, in this instance, directly opposite the neck 70. The opening 111 is normally closed by a cover plate 112. When the pump is to be mounted the plate is simply removed and the pump fitted into the opening as shown. It will be understood that the pump is formed with a suitably shaped and dimensioned shoulder portion to fit snugly into the opening 111 and that suitable retaining means such as locking screws may be utilized to hold it in place.

To provide for driving the pump, the pump drive shaft 113 is fitted with a beveled gear 114 and the mounting parts are so proportioned that the gear 114 meshes with the beveled gear 74 when the pump is mounted. Thus, a single gear is utilized for driving both the main drive shaft and the pump.

When mounted the pump has its inlet connected by a conduit 115 with the fluid tank or reservoir provided on the swather. The outlet of the pump is connected to deliver pressure fluid by way of a conduit 116 to the actuator 42, it being understood that a suitable control valve is interposed between the pump, the reservoir and the actuator to provide for the delivery of pressure fluid to and exhaust of pressure fluid from the actuator.

It will be apparent from the foregoing that the invention provides a drive mechanism of novel and advantageous construction particularly suitable for driving the power operated components of a swather or windrower of the type adapted to be pulled behind a tractor. Thus, a single main drive shaft serves to distribute the power received from the tractor power take-off to the cutter bar, the conveyor and the reel of the swather. The main drive shaft and a substantial part of the gearing through which power is supplied to the swather components are completely enclosed in the frame structure, leaving none of the high speed parts exposed. Thus, the operator of the equipment is amply protected from coming in contact with rapidly moving elements that might cause injuries.

The improved drive mechanism also provides simple and conveniently available means for the mounting and driving of a hydraulic pump to supply pressure fluid when none is available from the tractor with which the swather is associated. In general, the entire drive mechanism is simple in construction and reliable in operation. As indicated above, it is adequately guarded for safety since substantially all of the rapidly rotating parts are completely enclosed.

We claim as our invention:

1. In a swather adapted to be pulled behind a tractor and hving a plurality of power driven components, the combination of a frame supporting the power driven components including an elongated frame member, said member comprising two axially alined tubular sections, a first housing interposed between and rigidly connecting said sections, a second housing secured to the end of one of said sections remote from said first housing, a main drive shaft extending through said one section and into each of said housings, bearings in said housings rotatably supporting said shaft, a tubular neck extending laterally of each housing and connected thereto, a power input shaft rotatably supported in the neck extending from one of said housings, gearing in said one housing drivingly connecting said power input shaft with said main shaft, a component driving shaft rotatably supported in the neck extending from the other housing, and gearing in said other housing drivingly connecting said main shaft with said component driving shaft.

2. A swather as defined in claim 1 including an intermediate shaft supported on and externally of said one section of the frame member with its axis substantially parallel to the main shaft, a chain and sprocket connection from said main shaft to said intermediate shaft, and a casing mounted on the housing supporting the power input shaft, said casing enclosing said chain and sprocket connection.

3. A swather as defined in claim 1 in which the gearing connecting the power input shaft with the main shaft comprises beveled gears fixed to the respective shafts within said one housing, a hydraulic pump mounted on said one housing with its shaft extending into the housing, and a beveled gear on the pump shaft adapted to mesh with the beveled gear on one of the other shafts to establish a driving connection for the pump.

4. A swather adapted to be coupled in trailing relation to a tractor comprising, in combination, a laterally elongated frame supported at opposite sides by ground wheels, coupling means at one side of the frame adapted to connect the swather to a tractor, a cutter bar supported on said frame, a reel supported on said frame in position to press crop material toward said cutter bar, a side delivery conveyor supported on said frame and terminating, at one side, inwardly of said coupling means, to receive the cut crop material and discharge it at said terminus, said frame including a tubular member connected to said coupling means and extending parallel to the cutter bar, driving mechanism for the cutter bar, the reel and the conveyor including a main drive shaft extending through said tubular member, means including a coupling shaft connecting said main shaft with the power take-off shaft of the tractor, said coupling shaft having a driving connection with the main shaft at the end adjacent said coupling means, a power delivery shaft drivingly connected with said main shaft at the rear of said cutter bar and said conveyor, and means providing a driving connection from said power delivery shaft to said cutter bar and said conveyor.

References Cited in the file of this patent

UNITED STATES PATENTS

| | | |
|---|---|---|
| 818,735 | Bogart | Apr. 24, 1906 |
| 1,054,113 | Haring | Feb. 25, 1913 |
| 2,725,706 | Ashton et al. | Dec. 6, 1955 |
| 2,817,943 | Collins | Dec. 31, 1957 |